United States Patent

[11] 3,592,563

| [72] | Inventors | William H. Glass;<br>Robert J. Bridigum, both of Pittsburgh, Pa. |
|---|---|---|
| [21] | Appl. No. | 787,895 |
| [22] | Filed | Dec. 30, 1968 |
| [45] | Patented | July 13, 1971 |
| [73] | Assignee | Westinghouse Air Brake Company<br>Wilmerding, Pa. |

[54] FILTER PURGING APPARATUS
3 Claims, 4 Drawing Figs.

[52] U.S. Cl. ................................................ 417/307,
55/302, 55/316, 55/417, 137/596.2, 417/26
[51] Int. Cl. ........................................................ F04b 19/00
[50] Field of Search .................................... 55/62, 162,
163, 179, 302, 213, 218, 316, 313, 417;
137/512.5, 102, 596.14, 596.18, 596.2, 513.3;
417/307, 26

[56] References Cited
UNITED STATES PATENTS

| 1,373,599 | 4/1921 | Clark | 137/596.18 |
| 2,486,164 | 10/1949 | Jerome | 137/512.5 |
| 3,080,693 | 3/1963 | Glass et al. | 55/163 |
| 3,194,255 | 7/1965 | Flaton et al. | 137/513.3 |
| 3,258,899 | 7/1966 | Coffin | 55/162 |
| 3,279,151 | 10/1966 | Kauer, Jr. et al. | 55/62 |
| 3,426,508 | 2/1969 | McGrath et al. | 55/267 |
| 3,464,186 | 9/1969 | Hankison et al. | 55/316 |
| 3,472,000 | 10/1969 | Glass et al. | 55/163 |

FOREIGN PATENTS

| 866,778 | 5/1961 | Great Britain | 137/596.2 |

*Primary Examiner*—Frank W. Lutter
*Assistant Examiner*—Bernard Nozick
*Attorneys*—Adelbert A. Steinmiller and Ralph W. McIntire, Jr.

ABSTRACT: A filter purging apparatus used in conjunction with a desiccant-type dryer device which is interposed in a compressed air system between the air compressor and the storage reservoir for drying the air before reaching the reservoir, the purging apparatus includes a control valve device arranged in the system in such manner as to be responsive to supply of compressed air from the compressor during the cut-in stage of the compressor for effecting flow of said compressed air to the storage reservoir through the dryer, and responsive to control pressure supplied thereto, upon operation of the governor device in cutting out the compressor, for cutting off charging of the storage reservoir and opening a restricted passage to atmosphere via which dry air from the reservoir flows reversely through the dryer device to atmosphere, at a restricted rate, for purging the desiccant in the dryer of moisture accumulated therein, such reverse flow and purging continuing until the governor device restores the compressor to its cut-in or compressing stage.

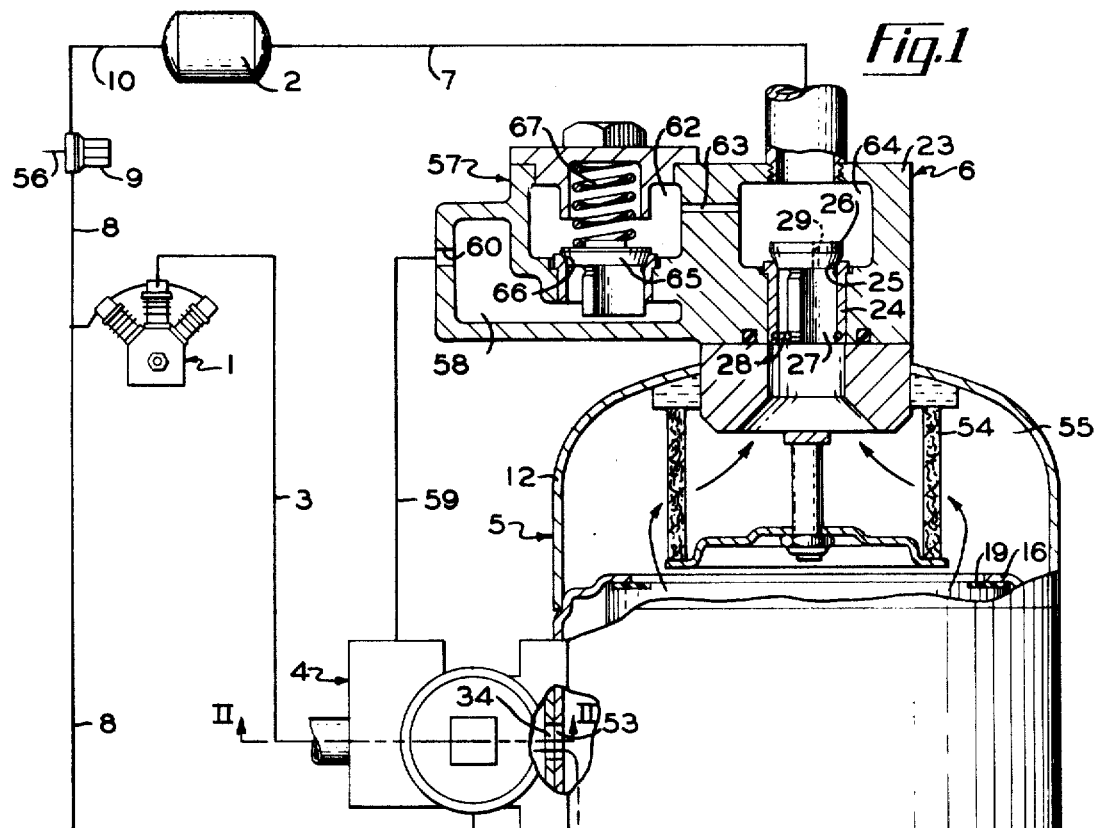
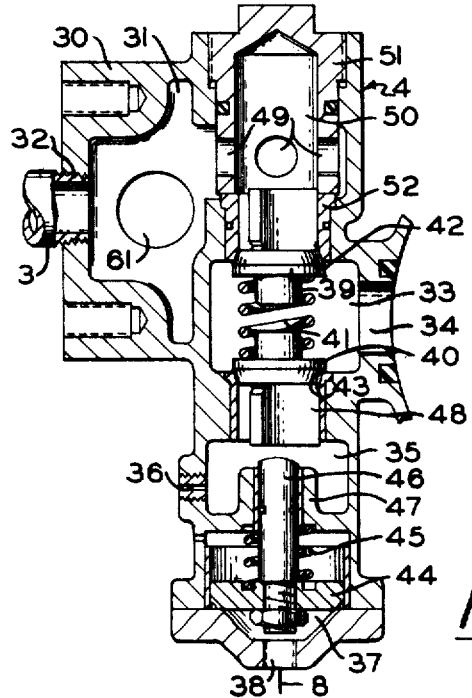
Fig.1
Fig.2
INVENTOR.
WILLIAM H. GLASS
ROBERT J. BRIDIGUM
BY
*A. A. Steinmiller*
ATTORNEY

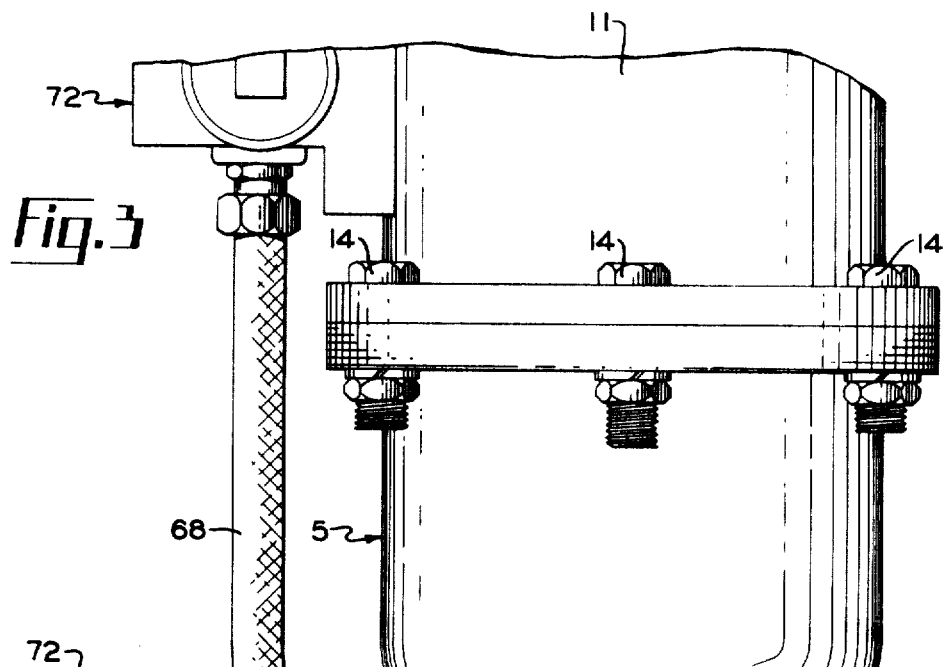
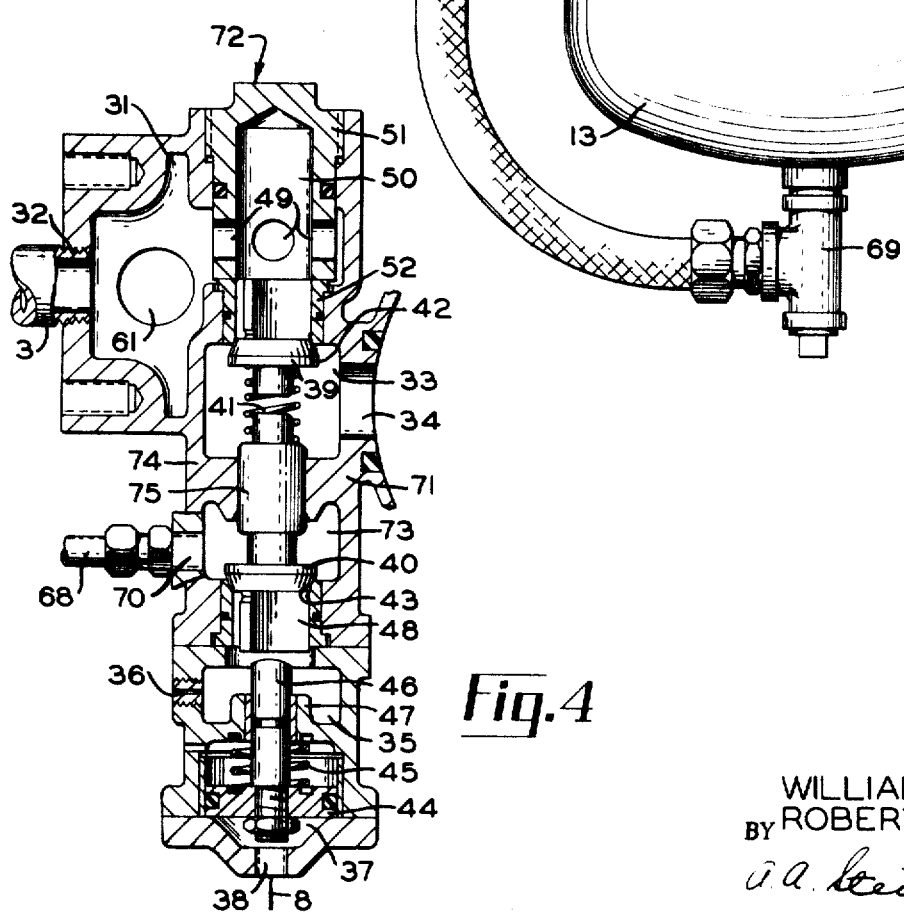

3,592,563

FILTER PURGING APPARATUS

BACKGROUND OF THE INVENTION

Normally a compressed air system includes an aftercooler through which the compressed air flows upon leaving the compressor. As the compressed air cools while passing through the aftercooler, moisture present therein condenses and accumulates in a sump usually associated with the aftercooler. The moisture thus accumulated in the sump is ejected periodically from the system by an automatic drain valve device, the operation of which may be controlled by and synchronized with the operation of the governor device provided for loading and unloading the compressor in maintaining the pressure in the storage reservoir within a certain pressure range.

The condensation of moisture in the compressed air flowing through the aftercooler and the subsequent ejection of the condensate through the automatic drain valve does not necessarily insure that all the moisture in the compressed air has been removed. Consequently, it has become a common practice to install one or more drying devices in the system between the aftercooler and the storage reservoir. Such dryer devices may be of the type using a desiccant for adsorbing any residual moisture not removed by condensation in the aftercooler. After a period of operation, the desiccant, unless purged of the moisture adsorbed thereby, becomes too saturated with such moisture for effectively removing further moisture from the compressed air directed therethrough. To effectively purge the desiccant of the moisture adsorbed thereby, compressed air systems may be provided with such means synchronized with the operation of the compressor stages of operation, whereby during the unloaded period of compressor operation, dry air from the storage reservoir backflows, at a controlled rate, through the desiccant to atmosphere and thereby reconditions the desiccant for drying the compressed air directed therethrough during the subsequent loaded or compressing period of the compressor.

The apparatus above described, for effectively removing moisture from the compressed air, in some instances, is bulky, complex, and costly.

SUMMARY OF THE INVENTION

The object of the present invention, therefore, is to provide simplified filter purging apparatus for use in a compressed air system employing a desiccant-type dryer for removing moisture from compressed air supplied to a storage reservoir for usage, said apparatus being characterized by compactness and low production cost.

Briefly, the invention comprises a control valve device adapted to be mounted on a desiccant-type dryer or filter device interposed in the supply line between the air compressor and the storage reservoir, said control valve device being operably controlled by the governor in such manner that during the unloaded period of the compressor said control valve device cuts off the charging to the reservoir and opens an atmospheric communication via which dry air from the reservoir backflows through the desiccant filter at a controlled rate for purging said filter of moisture accumulated therein during the charging period of the reservoir. At the same time, any condensate which may have accumulated in a sump portion of the dryer device is also discharged via the atmospheric communication, thus eliminating the need for a separate drain valve device. Upon operation of the governor device to restore the compressor to its compressing stage, the control valve device is operated to close the atmospheric communication and to open the charging communication via which the reservoir is charged from the compressor.

In the drawings,

FIG. 1 is a schematic arrangement, with several components in section, of a compressed air system incorporating the invention;

FIG. 2 is a horizontal view, on a larger scale than FIG. 1 and in section, of a component of FIG. 1 taken along line II—II in FIG. 1;

FIG. 3 is a fragmentary view on the same scale as FIG. 1, of a modified component of the apparatus shown in FIG. 1;

and FIG. 4 is a horizontal view, in section and on the same scale of the component shown in FIG. 2 in modified form.

DESCRIPTION AND OPERATION—FIGS. 1 & 2

As shown in FIG. 1 of the drawings, a compressed air system, in which the invention may be used, may comprise an air compressor 1 which may be driven by any suitable means (not shown) such as an electric motor, a gasoline engine, or a power takeoff shaft, for example, for supplying compressed air to a main or storage reservoir 2 via a pipe 3 connected to a control valve device 4 which is mounted on a filter device 5 through which the compressed air passes. The compressed air flows from the filter device 5 through a check valve device 6 mounted thereon and via a pipe 7 connecting said check valve device to the storage reservoir 2.

If the compressor 1 is driven by a gasoline engine (not shown), for example, a fluid pressure-responsive engine throttle control device and a compressor unloader (both of which are associated with the compressor, but neither of which is shown) are connected by a pipe 8 to a standard-type governor device 9, which, in turn, is connected by a pipe 10 to the storage reservoir 2. The governor device 9, in well-known manner, operates responsively to a preselected maximum pressure in the reservoir 2 to a cutout position for causing the throttle control device to reduce the engine speed and, therefore, that of the compressor 1 to an idling speed, and at the same time cause the compressor unloader to unload the compressor by holding the compressor intake valves (not shown) constantly open to atmosphere and thereby prevent any compression action. Upon reduction of air pressure in the reservoir 2 to a preselected minimum pressure, the governor device 9 operates responsively to such minimum pressure to a cut-in position to cause the throttle control device to restore the engine and the compressor 1 to normal running speed and to cause the unloader device to load the compressor by restoring normal compressing operation thereof. The pressure in reservoir 2 is thus maintained within a range between the preselected maximum and minimum pressures at which the governor device 9 is set to respond. The flow of compressed air from the compressor 1 to the storage reservoir 2 is controlled by the control valve device 4 which is mounted by suitable means (not shown) on an intermediate casing section 11, as viewed in FIG. 1 of the drawings, of the filter device 5.

The filter device 5 also comprises an upper casing section 12, which is coaxially secured by a press fit on one end of the intermediate casing section 11, and a lower casing section 13 which is coaxially secured by a plurality of bolts 14 to the opposite end of said intermediate casing section. A replaceable cannister-type filter member 15 is coaxially secured within the casing sections 11 and 13 with one end abutting against an inwardly radially extending annular flange 16 formed at the one end of casing section 11, and the other end of said filter member resting against a washer-type spring seat 17. A spring 18 is compressed between the closed end of casing section 13 and spring seat 17 for urging a flat annular sealing gasket 19 surrounding the upper open end of the filter member 15 into sealing relation with the adjacent flat surface of the flange 16.

The filter member 15 comprises a desiccant filter element 20 encased within a cylindrical shell 21, said shell being of such diameter relative to the casing sections 11 and 13 as to provide an annular space 22 between the outer wall of said shell and the inner walls of said casing sections. Thus, since the gasket 19 forms an airtight seal between space 22 and the inner space of casing section 12, compressed air flowing from the control valve device 4 (as will be more fully explained hereinafter) into the filter device 5 must flow into the annular space 22, thence through the open spring seat 17 into and through the desiccant filter element 20, following a course indicated by the arrows in the drawing, and out through the check valve 6 into pipe 7 to the storage reservoir 2.

The check valve device 6, which is secured to the upper casing section 12, by suitable means not shown, comprises a casing 23 in which a valve seat member 24 in the form of a bushing is fixed and has formed at one end thereof an annular valve seat 25 on which a valve member 26 is adapted to seat in a closed position. In the closed or seated position of valve 26, backflow from storage reservoir 2 through the filter device 5 is thus prevented, except at a restricted rate which will be more fully explained hereinafter. The valve member 26 has integrally formed thereon a guide portion 27 coaxially and slidably disposed in the seat member 24 for guiding the movement of said valve member between its seated position, above defined, and an unseated or open position when effected by prevailing fluid pressure acting on the under side of said valve member and causing upward movement thereof to said unseated position, said upward movement being limited by engagement of a stop ring 28, fixed in the lower end of said guide portion, with the lower end of the valve seat member 25. In the open position of valve member 26, supply of compressed air may flow unrestrictedly from the filter device 5 to the storage reservoir 2. Restricted passage means, in this instance a passageway 29 of predetermined diameter and flow capacity formed in the valve member 26, is provided to permit restricted flow of compressed air reversely from the reservoir 2 through the filter device 5, when the valve member is in its seated or closed position, for a purpose to be hereinafter disclosed.

According to the invention, the control valve device 4 mounted on the intermediate casing section 11 and as shown in FIG. 2, comprises a casing 30 having formed therein a supply chamber 31 connected via a supply port 32 to pipe 3, a delivery chamber 33 connecting via a delivery port 34 directly into the space 22 in the filter device 5, an exhaust chamber 35 opening to atmosphere via an atmospheric or exhaust port 36, and a control chamber 37 connected via a control port 38 to pipe 8 from the governor device 9.

A poppet-type supply valve 39 for controlling communication between supply chamber 31 and delivery chamber 33 is disposed in casing 30 oppositely to and in axially spaced alignment with a poppet-type exhaust valve 40 which controls communication between delivery chamber 33 and exhaust chamber 35. A spring 41 of preselected compression rating is compressed between supply valve 39 and exhaust valve 40 for urging said valves axially apart toward respective seated or closed positions on respective valve seats 42 and 43 fixed in casing 30 adjacent supply chamber 31 and exhaust chamber 35, respectively. When in their respective seated positions, valves 39 and 40 cut off communication between supply chamber 31 and delivery chamber 33 and between delivery chamber 33 and exhaust chamber 35, respectively.

The control valve device 4 further comprises a piston member 44 adjacent control chamber 37 and subject on a pressure side adjacent said chamber to any fluid pressure prevailing therein, the opposite side of said piston, which is axially aligned with the poppet valves 39 and 40, being subject to the force of a spring 45 acting on said piston in opposing relation to pressure acting on the pressure side. The piston member 44 is provided with a piston stem 46 extending coaxially from the side adjacent spring 45 through a guide member 47 fixed internally of casing 30, said stem being of such length as to terminate short of contact with a fluted guide portion 48 of exhaust valve 40 when said piston is in a normal position abutting the adjacent end wall of casing 30 and in which it is shown in the drawing.

In operation, with the compressor 1 loaded, as above explained, compressed air therefrom is supplied via pipe 3 to the inlet port 32 and supply chamber 34 of the control valve device 4. See FIG. 2. Compressed air from supply chamber 34 flows through a plurality of openings 49 and into a recess 50 formed in a retaining bushing 51 which serves to hold a valve seat member 52 (on which the valve seat 42 is formed and in which a fluted guide portion of supply valve 39 is slidably disposed) in fixed position in the casing 30. Compressed air in recess 50 acting on the adjacent side of supply valve 39 in opposing relation to the force of spring 41, causes said supply valve to be moved to an unseated or open position and thereby further compresses said spring to insure seating of exhaust valve 40 on valve seat 43. Compressed air thus flows past the unseated supply valve 39, through delivery chamber 33, and into the filter device 5 via delivery port 34 and a port 53 formed in the casing 13 of said filter device and opening directly into the space 22. Since the cylindrical shell 21 encasing the desiccant filter element 20 is entirely closed except at the top (which opening is sealed off from space 22 by the sealing gasket 19) and at the bottom, which is surrounded by the open washer-type spring seat 17, the compressed air entering space 22 must follow the course indicated by the arrows, that is, downwardly through space 22, thence up through the opening in said spring seat and through said desiccant filter element which adsorbs and removes the moisture therefrom as it passes therethrough.

Dry compressed air leaving the desiccant filter element 20 flows, in the direction indicated by the arrows, through a fiber-type filter element 54 fixed in an upper chamber 55 of the filter device 5, whereby dust and other foreign materials are removed from the compressed air before passing through the check valve device 6. Compressed air acting on the lower side of valve member 26, as viewed in FIG. 1, causes said valve member to be operated to its open position (above described), whereby such compressed air, which is moisture and dust free after having passed through the filter elements 20 and 54, flows via pipe 7 to the storage reservoir 2.

When the pressure of compressed air in the reservoir 2 attains the preselected maximum pressure, the governor device 9 operates to its cutout position to open a communication therethrough (not shown) between pipes 10 and 8. Compressed air from storage reservoir 2 is then supplied via pipes 10 and 8 to the compressor unloader device (not shown) to thereby effect unloading of the compressor 1 (above discussed) and thus terminate further supply of compressed air to said storage reservoir.

At the same time, compressed air is also supplied via pipe 8, which is also connected to control port 38 of the control valve device (see FIG. 2. At the initiation of such supply of control pressure to control chamber 37, that is, at the instant that the governor device 9 operates to its cutout position, said control pressure is substantially equivalent to the pressure prevailing in the supply chamber 31, because the respective pressures in said supply chamber and in said control chamber are equivalent to the pressure in the storage reservoir 2, which, at that moment is at the preselected maximum pressure (above defined) that causes operation of the governor device to its said cutout position. The dimension of the pressure area of piston member 44 adjacent control chamber 37 (and which is, therefore, subject to the control pressure prevailing therein) is such that notwithstanding the equivalency of the respective pressures in the control chamber and the supply chamber 31, the force of the control pressure acting on said pressure area is sufficient for moving said piston member upwardly (as seen in FIG. 2) out of its said normal position (above defined) to a purge position to be immediately defined.

As the piston member 44 moves toward its purge position, in response to pressure in chamber 37 acting thereon, the stem 46 comes into contact with the guide portion 48 of exhaust valve 40 to thereby cause said exhaust valve to be moved from its seated position (above defined) on valve seat 43 to an unseated or exhaust position in which communication between delivery chamber 33 and exhaust chamber 35 is established. Movement of piston member 44 toward its purge position and consequent unseating of exhaust valve 40 also results in compressive action on spring 41 to an extent that supply valve 39 is thereby forced to its seated position on seat 42 to cutoff communication between supply chamber 31 and delivery chamber 33. It should be evident therefore that in order to effect operation of the piston member 44 to its purge position, the pressure area of said piston member adjacent control chamber 37 must be of such dimension that the resulting force of the pressure acting thereon be sufficient for overcoming the combined opposing forces of springs 41 and 45 and the pressure of compressed air (which may be trapped in pipe 3, supply chamber 31 and recess 50 when the compressor 1 is unloaded) acting on the side of supply valve 39 adjacent recess 50.

With piston member 44 in its purge position, that is, when supply valve 39 is in its seated position and exhaust valve 40 is in its unseated position, dry compressed air may flow reversely from the reservoir 2, through pipe 7, and thence at a restricted controlled rate through the restricted passageway 29 in the valve member 26 of the check valve device 6 (since said valve member 26 is held in its closed position by the prevailing pressure on the upper side thereof). Such dry air follows, in a reverse order, the path followed by the compressed air from the delivery chamber 33 to the check valve device 6. As the dry air passes reversely through the desiccant filter element 20, it carries with it the moisture that was removed by and accumulated in said filter element, when the compressed air passed therethrough en route from the compressor 1 to the storage reservoir 2 during the loaded period of the compressor, thereby purging the filter element of such moisture and reconditioning said filter element for the sequential resupply period on which the reservoir is recharged. The moisture-laden air flowing reversely from the desiccant filter element 20 to the delivery chamber 33 is exhausted to atmosphere past the unseated exhaust valve 40, through exhaust chamber 35 and atmospheric port 36.

The purging process immediately above described continues at the restricted rate determined by passageway 29 in check valve device 6 until the pressure of compressed air in storage reservoir 2, either through usage or other causes, reduces to the predetermined minimum pressure, above defined.

With the pressure in reservoir 2 reduced to the preselected minimum pressure, the governor device 9, which is set to respond to said minimum pressure, concurrently causes the throttle control device (not shown) to restore the engine (not shown) to normal running speed, relieves the compressor unloader (not shown) of actuating pressure via pipe 8 and an atmospheric vent 56 in said governor device for restoring the compressor 1 to a loaded condition, and relieves the control pressure in control chamber 37 of the control valve device 4 via pipe 8 and said atmospheric vent. Upon relief of pressure in chamber 37, spring 45 moves the piston member 44 to its normal position with stem 46 out of contact with the guide portion 48 of the exhaust valve 40, which is restored to its seated or closed position by spring 41. With the compressor 1 reloaded, compressed air is again supplied to chamber 31 and, therefore, to recess 50 for unseating supply valve 39, whereby in the manner above described, recharging of storage reservoir 2 continues until the pressure therein is built up to the preselected maximum pressure.

Thus, each complete cycle of operation of the filter purging apparatus, as above described, comprises: (a) a charging period during which the storage reservoir 2 is charged with compressed dry air which has the moisture removed therefrom by passing through the desiccant-type filter device 5 en route to the storage reservoir, said charging period continuing until the pressure in said reservoir has attained the preselected maximum pressure, and (b) a purging period during which dry air from said storage reservoir flows reversely, at a restricted controlled rate, through said filter device to atmosphere for purging the desiccant member 20 of moisture accumulated therein during the charging period, said purging period terminating with the restoration of the compressor 1 to a loaded state upon reduction of pressure in the storage reservoir (primarily because of usage) to the preselected minimum pressure. Due to the restricted controlled rate at which the flow of purging air flows from the reservoir 2, the amount of compressed air thus consumed is relatively insignificant compared to the amount of compressed air demanded from said reservoir for normal usage.

In the event that the filter element 20 in the filter device 5 should become clogged or congested, or that the control valve device 4 should fail to function properly, or that any other malfunction should occur so that the flow of compressed air supply from pipe 3 to the storage reservoir 2 is prevented from following the normal course, that is, through the filter device 5, as above described, a bypass check valve device 57 is provided, whereby supply of compressed air to the storage reservoir may bypass the control valve device and the filter device. Thus, a supply of compressed air in the reservoir 2 for use when needed is assured.

The check valve device 57 may be disposed in the same casing 23 in which check valve device 6 is contained, and for purposes of distinction, the former will be referred to hereinafter as the bypass check valve device and the latter as the main check valve device. The bypass check valve device 57 includes a supply chamber 58 connected via a pipe 59 to the supply chamber 31 of the control valve device 4, said pipe having one end connected to a port 60 in casing 23 opening to supply chamber 58 and the other end connected to a port 61 in casing 30 opening to supply chamber 31. Bypass check valve device 57 further comprises a delivery chamber 62 connecting via a passageway 63 with a chamber 64 disposed on the upper side (as viewed in FIG. 1 of the valve member 26 of the main check valve device 6, said chamber 64 being open to pipe 7 leading to the storage reservoir 2.

A valve member 65, operatively interposed between chambers 58 and 62, is normally held in a seated or closed position on a valve seat 66 by a spring 67 of preselected compression rating for cutting off communication between said chambers. If the pressure of compressed air in supply chamber 58 attains a valve sufficient for overcoming the opposing force of spring 67, which occurs only in the event that the supply flow of compressed air cannot follow its normal course, as above explained, the valve member 65 is forced from its seated position to an unseated or open position in which such supply of compressed air from chamber 58 may flow past said unseated valve member to chamber 62, through passageway 63 to chamber 64, and via pipe 7 to the storage reservoir 2, thus assuring a constant supply of compressed air in said reservoir.

DESCRIPTION & OPERATION—FIGS. 3 & 4

The filter purging apparatus shown in FIGS. 3 and 4 of the drawings differs from that shown in FIGS. 1 and 2 in that the stream of purging dry air flowing reversely from the reservoir 2 through the filter device 5 for purging the filter element 20 does not follow a course similar to that followed by the purge stream in the apparatus shown in FIGS. 1 and 2. In the apparatus shown in FIG. 1, the purge stream, upon leaving the filter element 20, passes through the space 22 and out through the exhaust chamber 35 and exhaust port 36 in the control valve device 4. In the filter purging apparatus shown in FIGS. 3 and 4, the purge stream is directed away from space 22 and to the outside of casing 13 to a bypassing purge tube 68 having one end connected to a pipe fitting 69 fixed at the bottom of casing 13, as viewed in the drawing, and opening to the interior thereof, the other end of said tube being connected to a port 70 formed in a casing 71 of a control valve device 72, which is similar in certain respects to the control valve device 4, except as hereinafter noted. As viewed in FIG. 3, the connection of purge tube 68 with the control valve device 72 appears at the bottom of said control valve device. In FIG. 4, however, for purposes of clarity, the connection of tube 68 with port 70 of the control valve device 72 is rotated 90° so that the connection appears on the plane of the drawing.

Since certain components of the apparatus shown in FIGS. 3 and 4 are identical to corresponding components of the apparatus shown in FIGS. 1 and 2, said certain components are designated by identical reference numerals as those used for the corresponding components of the apparatus shown in FIGS. 1 and 2.

The control valve device 72 differs from the control valve device 4 in that the former is provided with a buffer chamber 73 interposed between the delivery chamber 33 and the exhaust chamber 35, and into which buffer chamber the port 70 and purge tube 68 open. The exhaust valve 40 is operatively interposed between the buffer chamber 73 and the exhaust chamber 35, said buffer chamber being isolated from the delivery chamber 33 by a separating wall 74 through which an extension member 75 is slidably operable in coaxial alignment with the supply valve 39 and the exhaust valve 40. One end of the extension member 75 makes abutting contact with the exhaust valve 40, while the other end, because of the preselected length of said extension member, is axially spaced apart from the supply valve 39 with the spring 41 compressed therebetween for biasing said supply valve and said exhaust valve, by acting through the extension member, toward their respective seated positions (above described).

Generally, the control valve device 72 functions similarly to the control valve device 4, and, therefore, it is not deemed essential that the operation of the control valve device 72 be described in detail. When control pressure is supplied to the control chamber 37 (upon operation of the governor device 9 to its cutoff position), exhaust valve 40 is operated to its open position, and the supply valve 39 to its closed position to permit reverse flow of dry compressed air through the desiccant filter element 20 for purging said element of the moisture accumulated therein during the charging period. Such exhaust or purge air, however, cannot flow through space 22 and delivery chamber 33 to reach the atmospheric port 36, because said delivery chamber, as above noted, is isolated from the exhaust chamber 35. The stream of purge air must flow through the purge tube 68 into the buffer chamber 73, past the unseated exhaust valve 40, and out to atmosphere through exhaust chamber 35 and atmosphere port 36.

The apparatus as shown in FIGS. 3 and 4 is particularly desirable for a compressed air system operating in atmospheric conditions which tend to produce a great deal of moisture condensate which, in turn, accumulates at the bottom of the filter device 5. Since the purge tube 68 provides a more confined course for flow of the purge air (as compared to the annular space 22 surrounding the canister 15 through which purge air flows in the apparatus shown in FIG. 1), any condensate accumulated in the bottom of casing 13 adjacent the fitting 59 is more effectively carried away through said purge tube to atmosphere via the atmospheric port 36.

I claim:

1. For use in a compressed air system including air compressing means and a storage reservoir for the air compressed thereby, the combination of a filter device having an inlet via which compressed air may be admitted thereinto and an outlet via which dry compressed air may flow thereoutof, and a control valve device operably interposed between the compressing means and the filter device inlet, said control valve device comprising:
   a. a casing having:
      i. a supply port via which compressed air may be admitted,
      ii. a delivery port communicating with the filter device inlet,
      iii. an atmospheric port, and
      iv. passage means communicable with said supply, delivery and exhaust ports for selectively providing a supply communication between said supply port and said delivery port and an exhaust communication between said delivery port and said atmospheric port,
   b. supply and exhaust valves disposed in said passage means and having respective oppositely facing sides;
   c. common biasing means disposed in said passage means and compressed between said oppositely facing sides for biasing both said supply and exhaust valves simultaneously toward respective closed positions in which both said supply and exhaust communications are closed;
   d. said supply valve being subject, on the side opposite its said facing side, and operable responsively to the pressure of compressed air prevailing at said supply port, when such pressure is sufficient for overriding the opposing effect of said biasing means acting on the facing side thereof, to an open position, in which said supply communication is open to provide flow of compressed air therethrough in one direction to the storage reservoir via said filter device, and in which open position such pressure prevailing in said passage means, cooperatively with said biasing means, exerts a combined force on the facing side of said exhaust valve for maintaining said exhaust valve in its said closed position;
   e. piston means in said casing selectively subjectable and operable responsively to a control pressure, at a degree sufficient for overriding said combined force acting on said facing side of said exhaust valve, to an exhaust position in which said exhaust valve is engaged by said piston means on the side opposite its said facing side to effect operation of said supply valve to its said closed position and operation of said exhaust valve to an open position in which said exhaust communication is open and compressed air may flow therethrough in a reverse direction relative to said one direction from the storage reservoir through the filter device to atmosphere; and
   f. check valve means serially interposed between the filter device outlet and the storage reservoir for providing unrestricted flow of compressed air in said one direction and restricted flow in said reverse direction.

2. The combination, as set forth in claim 4, wherein said check valve means comprises:
   a. a check valve member operable responsively to a pressure corresponding to that of compressed air in said supply communication to an open position in which compressed air may flow unrestrictedly in said one direction while checking reverse flow therepast, and
   b. restricted means via which compressed air may flow in said reverse direction at said restricted rate.

3. The combination, as set forth in claim 1, further characterized by bypassing means comprising:
   a. bypassing passage means communicating with said supply port and via which compressed air may flow from said supply port to the storage reservoir in bypassing relation to said filter device and said check valve means, and
   b. a bypass valve device interposed in said bypassing passage means and having a normally closed position in which communication through said bypassing passage means is interrupted, said bypass valve device being operable, responsively to buildup of air pressure in said bypassing passage means to a certain pressure exceeding that of the compressed air in said supply communication, to an open position in which communication through said bypassing passage means is open.